US010669399B2

(12) United States Patent
Yu et al.

(10) Patent No.: US 10,669,399 B2
(45) Date of Patent: Jun. 2, 2020

(54) CONDUCTIVE SELF-HEALING NETWORK

(71) Applicants:Board of Regents, The University of Texas System, Austin, TX (US); Texas State University, San Marcos, TX (US)

(72) Inventors: Guihua Yu, Austin, TX (US); Ye Shi, Austin, TX (US); Xiaopeng Li, Austin, TX (US)

(73) Assignees: Board of Regents, The University of Texas System, Austin, TX (US); Texas State University, San Marcos, TX (US)

( * ) Notice: Subject to any disclaimer, the term of this patent is extended or adjusted under 35 U.S.C. 154(b) by 0 days.

(21) Appl. No.: 15/484,597

(22) Filed: Apr. 11, 2017

(65) Prior Publication Data
US 2017/0292008 A1 Oct. 12, 2017

Related U.S. Application Data

(60) Provisional application No. 62/320,909, filed on Apr. 11, 2016, provisional application No. 62/320,969, filed on Apr. 11, 2016.

(51) Int. Cl.
*C08K 5/3432* (2006.01)
*C08G 61/12* (2006.01)
*H01B 1/12* (2006.01)
*C08K 5/544* (2006.01)

(52) U.S. Cl.
CPC .......... *C08K 5/3432* (2013.01); *C08G 61/124* (2013.01); *C08K 5/5442* (2013.01);
(Continued)

(58) Field of Classification Search
CPC .. C08K 5/3432; C08G 61/124; C08G 221/00; C08G 2261/11; H01B 1/127
(Continued)

(56) References Cited

U.S. PATENT DOCUMENTS 6,924,047 B2 * 8/2005 Radu ........................ C07F 5/003
136/263
2008/0296530 A1 * 12/2008 Fuchs ..................... B82Y 25/00
252/62.54
(Continued)

OTHER PUBLICATIONS

Wang et al. "From Trigonal Bipyramidal to Platonic Solids; Self-Assembly and Self-Sorting Study of Terpyridine-Based 3D Architectures". Jun. 30, 2014. Journal of the American Chemical Society. 136, 10499-10507. Total pp. 9. (Year: 2014).*
(Continued)

*Primary Examiner* — William D Young
(74) *Attorney, Agent, or Firm* — Meunier Carlin & Curfman LLC

(57) ABSTRACT

Disclosed herein are self-healing conductive network compositions. The networks can contain one or more conductive polymers and one or more supramolecular complexes. The supramolecular complex can be introduced into conductive polymer matrix, resulting in a network of the two components. In this network, the nanostructured conductive polymer gel constructs a 3D network to promote the transport of electrons and mechanically reinforce the network while the supramolecular complex contributes to self-healing property and also conductivity. The networks disclosed herein are useful for various applications such as self-healing electronics, artificial skins, soft robotics and biomimetic prostheses.

18 Claims, 3 Drawing Sheets

(52) U.S. Cl.
CPC ......... *H01B 1/127* (2013.01); *C08G 2210/00* (2013.01); *C08G 2261/11* (2013.01); *C08G 2261/3221* (2013.01); *C08G 2261/37* (2013.01); *C08G 2261/50* (2013.01); *C08G 2261/51* (2013.01); *C08G 2261/62* (2013.01); *C08G 2261/792* (2013.01); *C08G 2270/00* (2013.01)

(58) Field of Classification Search
USPC .......................................................... 252/500
See application file for complete search history.

(56) References Cited

U.S. PATENT DOCUMENTS

2012/0043530 A1* 2/2012 Badre .................... H01B 1/122
257/40
2015/0144844 A1* 5/2015 Pozzo ....................... D01F 6/74
252/500

OTHER PUBLICATIONS

Wang et al. "From Trigonal Bipyramidal to Platonic Solids: Self-Assembly and Self-Sorting Study of Terpyridine-Based 3D Architectures", J. Am. Chem. Soc., 2014, 136, 29, 10499-10507.
Wang, et al., "Self-Assembly of Giant Supramolecular Cubes with Terpyridine Ligands as Vertices and Metals on Edges", Chem. Sci., 2014,5, 1221-1226.
Shi, et al., "A Conductive Self-healing Hybrid Gel Enabled by Metal-ligand Supramolecule and Nanostructured Conductive Polymer" Nano Lett. 15, 2015, 9, 6276-6281.

* cited by examiner

CONDUCTIVE SELF-HEALING NETWORK

CROSS REFERENCE TO RELATED APPLICATION

This application claims the benefit of U.S. Provisional Applications 62/320,909, filed Apr. 11, 2016, and 62/320,969, filed Apr. 11, 2016, the contents of each are hereby incorporated in their entirety.

FIELD OF THE INVENTION

This invention is directed to conductive gels with self-healing properties.

BACKGROUND

Self-healing materials with conductive properties have attracted growing interest in both academia and industry due to their potential applications in a broad range of technologies, such as self-healing electronics, medical devices, artificial skins, and soft robotics. For practical applications, these materials should demonstrate good conductivity and repeatable mechanical and electrical self-healing properties at room temperature, as well as decent mechanical strength and flexibility, to meet the requirements for fabrication of flexible devices.

Great efforts have been dedicated to developing conductive self-healing materials. Researchers have developed the use of microcapsules containing liquid precursor healing agents for structural healing. In these systems, the local healing agent is depleted after capsule rupture. Others have demonstrated an alternative approach by combining a supramolecular organic polymer and nickel microparticles, resulting in a composite with mechanical and electrical self-healing properties at ambient conditions; whereas a large number of inorganic particles are needed for the preparation of composite. Recently, a conductive and self-healing hydrogel has been synthesized by polymerization of pyrrole within agarose matrix. The self-healing behavior of the resultant composite, however, can only be excited under external thermal or optical stimuli. Therefore, the development of self-healing, highly conductive, mechanically strong, and light-weight materials remains a critical challenge.

In the past decades, the supramolecular chemistry has witnessed rapid development of metallo-supramolecular structures based on the highly directional and predictable feature of metal-mediated self-assembly. Driven by directional and conjugated structures and intermolecular forces, these supramolecular structures could further hierarchically self-assemble into higher order nanostructures, i.e., supramolecular gels. More importantly, due to the moderate bond energy of metal-ligand bonds and non-covalent interactions among supramolecules, the supramolecular gels can dynamically assemble or disassemble, associate or dissociate at room temperature, thus showing features such as self-healing property and sol-gel phase transitions. Recently, conductive polymer hydrogels (CPHs) such as polyaniline (PANI) and polypyrrole (PPy) hydrogels have been synthesized using phytic acid as the gelator and dopant. The framework of the resulted CPHs provides ideal 3D interconnected paths for electron transport, thus reaching a conductivity as high as 11 S/m. Such 3D hierarchically porous structures offer large open channels to support the introduction of second gel component and provide an ideal interface between conductive hydrogels and other synthetic systems. However, the fragile nature and lack of self-healing property inhibits CPHs' further applications.

There is a need for conductive materials exhibiting self-healing behavior. There is a need for materials with good conductivity, repeatable mechanical and electrical self-healing properties at room temperature, and good mechanical strength and flexibility. There is a further need for a method providing a variety of networks using a common synthetic strategy.

The invention disclosed herein addresses, in part, one or more of the aforementioned needs.

SUMMARY

Disclosed herein are self-healing conductive network compositions and methods of making the same. The networks can contain one or more conductive polymers and one or more supramolecular complexes. The supramolecular complex can be introduced into conductive polymer matrix, resulting in a network of the two components. In this network, the nanostructured conductive polymer gel constructs a 3D network to promote the transport of electrons and mechanically reinforce the network while the supramolecular complex contributes to self-healing property and also conductivity. The networks disclosed herein are useful for various applications such as self-healing electronics, artificial skins, soft robotics and biomimetic prostheses.

Conductive polymers useful in the disclosed networks include polyanilines, polypyrroles, polythiophenes, and combinations thereof. The conductive polymer can include at least one polyacid dopant.

The supramolecular complex can be an organometallic complex, and in certain embodiments can have a cubic architecture. The supramolecular complex can be formulated as a gel which, when apart from the conductive polymer, can be characterized by a sol-gel transition of less than or about 80° C., less than or about 70° C., less than or about 60° C., or less than or about 50° C. The low sol-gel transition temperature allows supramolecular complex fragments to reassemble near a damaged area of the network, thereby permitting self-healing.

Cubic supramolecular organometallic complexes can include tritopic ligands, held together by ditopic metal-ligand bonds. Cubic supramolecular organometallic complexes can have the formula $M_{12}L_8$, in which M is a metal and L is a tritopic ligand. Tritopic ligands can have a central core, from which three rigid spacer moieties extend, said spacers terminated with a chelating group. In some instances, the chelating group can be a tridentate chelating group.

Self-healing conductive networks can be obtained from a conductive hydrogel and a supramolecular complex. The hydrogel can be dehydrated to form an aerogel, which can be mixed with the supramolecular complex in a suitable solvent to give the self-healing conductive network.

The details of one or more embodiments are set forth in the descriptions below. Other features, objects, and advantages will be apparent from the description and from the claims.

DETAILED DESCRIPTION

Figure 1A:
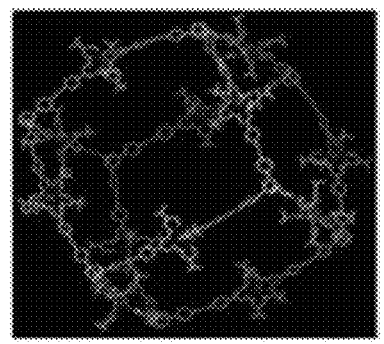
FIG. 1A includes a depiction of a cubic supramolecular complex having the Formula $M_{12}L_8$.
Figure 1B:
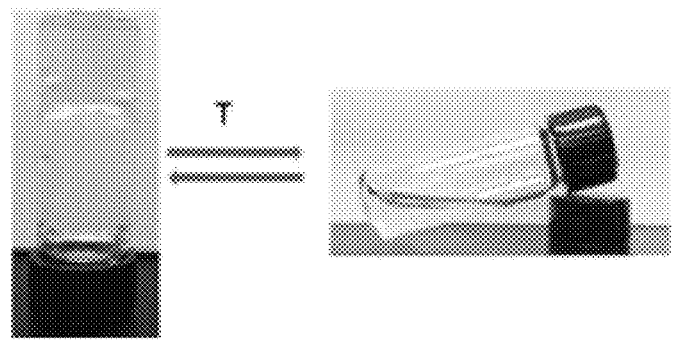
FIG. 1B includes a depiction of the sol-gel transition of a G-Zn-tpy/MeCN composition. The concentration of G-Zn-tpy to MeCN is approximately 5-10 wt %.
Figures 2A, 2B, 2C:
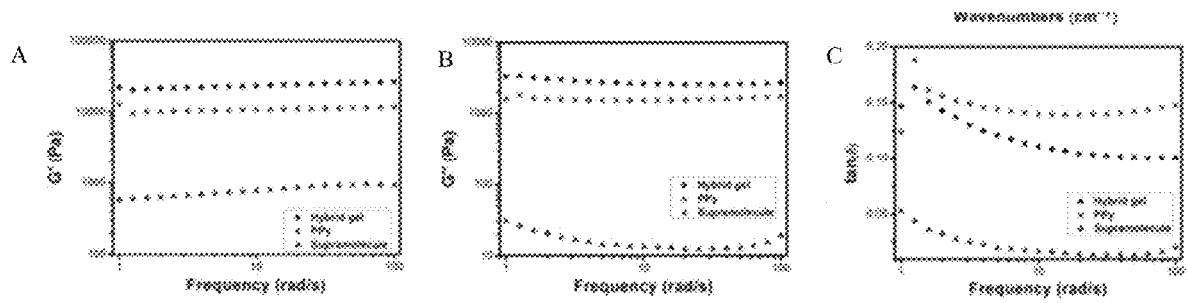
FIG. 2A includes a depiction of the storage modulus (G') of a supramolecular complex gel (triangles), a conductive hydrogel (circles) and network containing a conductive polymer and supramolecular complex (squares).
FIG. 2B includes a depiction of the loss modulus (G") of a supramolecular complex gel (triangles), a conductive hydrogel (circles) and network containing a conductive polymer and supramolecular complex (squares).
FIG. 2C includes a depiction of the tangent of the phase angle (G"/G') of a supramolecular complex gel (triangles), a conductive hydrogel (circles) and network containing a conductive polymer and supramolecular complex (squares).
Figures 3A, 3B, 3C, 3D, 3E, 3F:
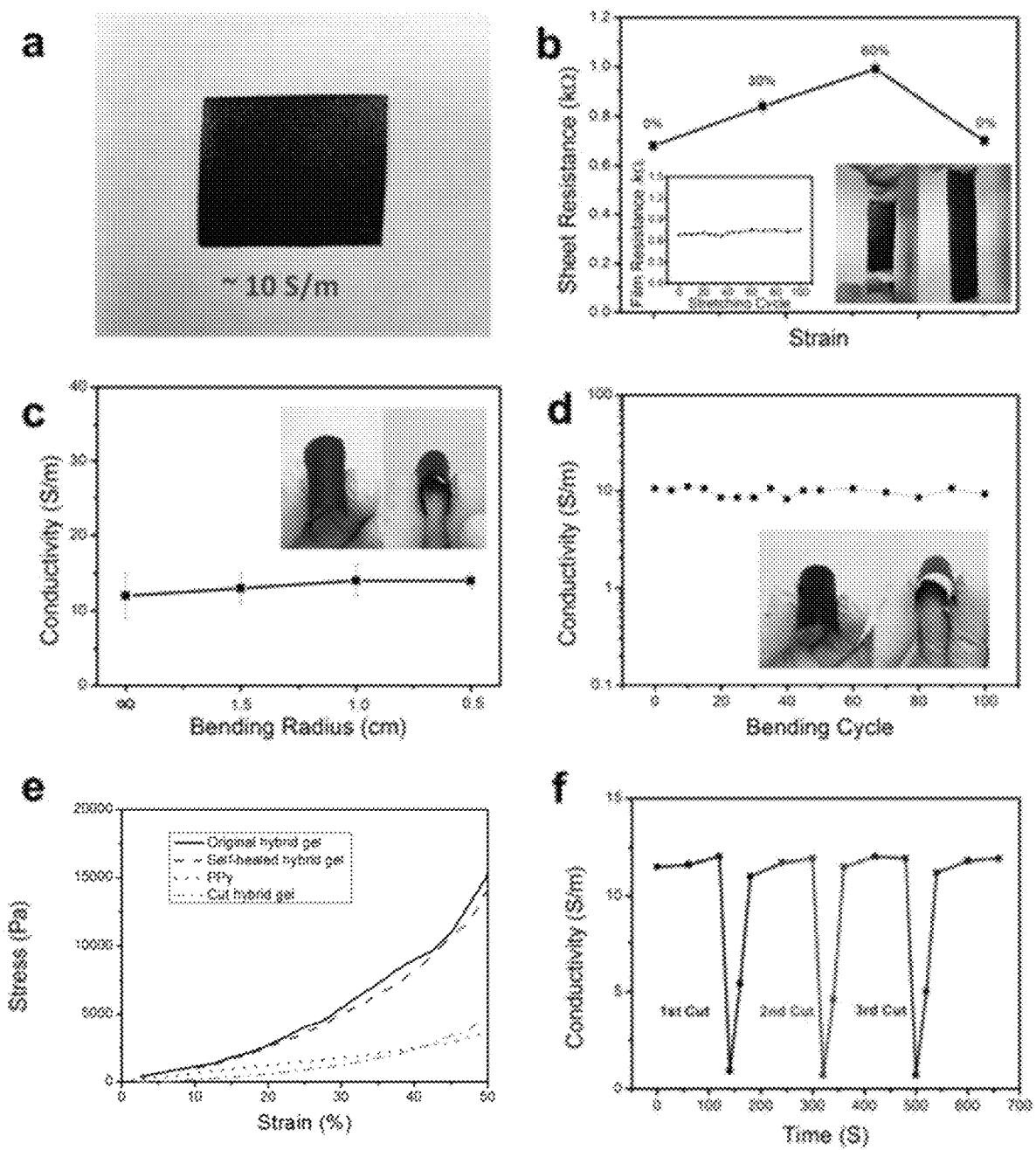
FIG. 3A includes a picture of a network thin film coated on a Kapton substrate.
FIG. 3B includes a depiction of the film resistance of a network thin film coated on PDMS substrate under different stretching states. Inset (left) shows the film resistance after different stretching cycles and inset (right) shows the optical images of network thin film at initial status and 67% strain.
FIG. 3C includes a depiction of the conductivy of a network thin film under different bending states. Inset shows the optical images of bended network thin film coated on PDMS substrate.
FIG. 3D includes a depiction of the conductivities of a network thin film after different bending cycles. Inset shows optical images of bended network thin film coated on Kapton substrate.
FIG. 3E includes a depiction of a compression test for an unstretched network thin film (solid line), a network thin film having undergone a self-healing process (long dashes), a conductive hydrogel (dots), and a cut network (dots and dashes).
FIG. 3F includes a depiction of the conductivities of a network at different stages during cutting and self-healing processes. The cut samples were physically contacted to each other to initiate self-healing.
Figures 4A, 4B, 4C, 4D:
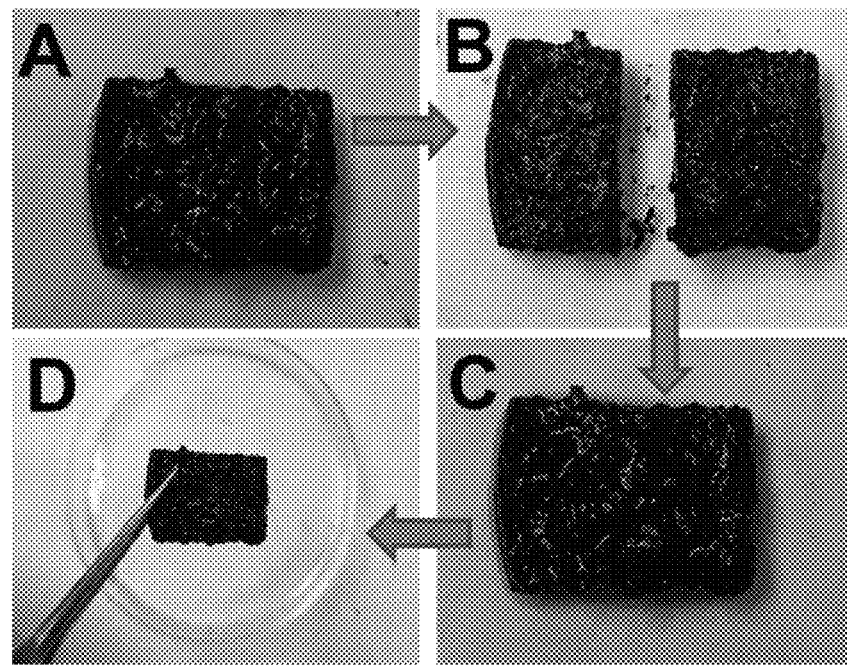
FIG. 4A-4D includes a depiction of the self-healing property of a network: A bulk sample was cut into half and then placed together. After 1 min, the two samples self-healed into an integrated film, which could support its own weight when lifted by a tweezers.
Figure 5:
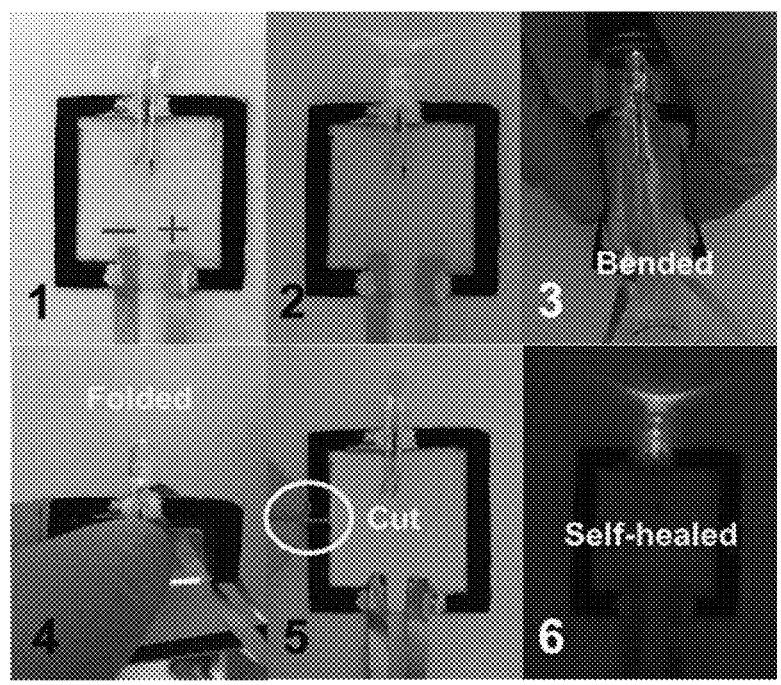
FIG. 5 includes a depiction of a self-healing circuit based on a network: (5-1) and (5-2) include optical images of circuit based on a network film at open and closed states; (5-3) and (5-4) demonstrate that the circuit functions well under bended and folded states; (5-5) and (5-6) include a depiction of the self-healing behavior of designed circuit: the left side of network film was cut and the circuit became open and the bulb was extinguished. After 1 min of self-healing, the circuit was re-established and the LED bulb could be lighted again.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes¬ from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

As used herein, the term "polybasic" refers to a molecule having more than one acidic proton.

As used herein, the term "Lewis basic atom" refers to an atom having at least one lone pair of electrons capable of coordinating to a proton or metal ion.

As used herein, the term "tritopic ligand" refers to a compound having a central core, wherein three arms extend from the core, each arm being terminated by a functional group or chemical moiety having at least one Lewis basic atom.

As used herein, the term "tridentate group" refers to a chemical moiety having three Lewis basic atoms arranged such that all three Lewis basic atoms can be coordinated to the same metal ion at the same time.

As used herein, the term "sol-gel transition temperature" refers to the temperature point at which a material/solvent mixture changes between a colloidal solution and an integrated network.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

Self-Healing Conductive Networks

Disclosed herein are self-healing, conductive networks. The networks can be gels at room temperature, and contain at least one conducting polymer, at least one supramolecular complex, and at least one solvent. In other embodiments, the networks can be liquid at room temperature, and only form gels at lower temperature.

The networks can be characterized by a conductivity of at least 5 S/m, at least 10 S/m, at least 15 S/m, at least 20 S/m, at least 25 S/m, at least 30 S/m, at least 35 S/m, at least 40 S/m, at least 45 S/m, or at least 50 S/m.

The networks can be characterized of a dynamic storage modulus (G') of at least 10 KPa, at least 15 KPa, or at least 20 KPa, as measured using rheological experiments performed by a rheometer in a frequency sweep mode.

The networks can be characterized of a loss modulus (G") of at least 1 KPa, at least 1.5 KPa, or at least 2.0 KPa, as measured using rheological experiments performed by a rheometer in a frequency sweep mode.

In some embodiments, after the network has undergone a breaking followed by self-healing, the conductivity of the self-healing network will be at least 50%, 60%, 70%, 80%, 90%, 95%, 97.5% or 99% of the conductivity of the network prior to breaking.

In some embodiments, after the network has undergone a breaking followed by self-healing, the dynamic storage modulus of the self-healing network will be at least 50%, 60%, 70%, 80%, 90%, 95%, 97.5% or 99% of the dynamic storage modulus of the network prior to breaking.

In some embodiments, after the network has undergone a breaking followed by self-healing, the loss modulus of the self-healing network will be at least 50%, 60%, 70%, 80%, 90%, 95%, 97.5% or 99% of the loss modulus of the network prior to breaking.

In some embodiments, after the network has undergone a breaking followed by self-healing, the conductivity of the self-healing network will be at least 80%, of the conductivity of the network prior to breaking, the dynamic storage modulus of the self-healing network will be at least 80% of the dynamic storage modulus of the network prior to breaking, and the loss modulus of the self-healing network will be at least 80% of the loss modulus of the network prior to breaking.

The networks can contain one or more conductive polymers and one or more supramolecular complexes. The supramolecular complex can be introduced into conductive polymer matrix, resulting in a network of the two components. In this network, the nanostructured conductive polymer gel constructs a 3D network to promote the transport of electrons and mechanically reinforce the network while the supramolecular complex contributes to self-healing property and also conductivity.

Conductive Polymers

The conductive polymer can include a polyaniline, a polypyrrole, a polyfuran, a polythiophene,], which may either be unsubstituted or substituted with one or more functional groups. In certain embodiments, the conductive polymer may include a compound having either of the following formulae:

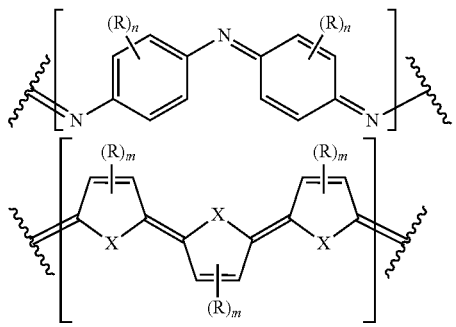

wherein R is $C_{1-6}$ alkyl, $C_{1-6}$ alkoxy, $C_{1-6}$ haloalkyl, $C_{1-6}$ haloalkoxy, F, Cl, Br, I, CN, $NO_2$, n is 0, 1, 2, 3 or 4, and m is 0, 1 or 2. Compounds in which X is NH are designated polypyrroles, when X is O are designated polyfuran, when X is S are designated polythiophene, and when X is Se are designated polyseleophene. In some embodiments, the conductive polymer can include compounds in which X is a mixture of O, S and/or NH. For instance, the conductive polymer can be a polyfuran wherein 1-5% of the X groups are N or S. In some embodiments it is preferred than n and m are both 0.

The conductive polymer can include one or more dopants. Exemplary dopants include polybasic compounds. In some embodiments, the dopant can have at least two, at least three, at least four, at least five, or at least six acidic groups. Exemplary acidic groups include carboxylic acids, sulfonic acids, and phosphoric acids. In some embodiments, the dopant can include one or polyacids, for instance, polystyrene sulfonic acid (PSS), poly(3,4-ethylenedioxythiophene) polystyrene sulfonic acid, poly(vinylphosphoric acid) or poly(meth)acrylic acid (including both methacrylic and acrylic acids), and salts of the same (e.g., Li, Na, K, Mg, Ca, and ammonium salts, including ammonia and substituted amines). Preferred dopants include aromatic rings substituted with 3 or more carboxylic acids, e.g., 1,2,4,5 benzenetetracarboxylic acid. Other dopants include copper phthalocyanine-3,4',4",4'"-tetrasulfonic acid tetrasodium salt (CuPcTs) and phytic acid, phytic acid being particularly preferred.

Conductive polymers can be obtained using an oxidative polymerization protocol. Generally, the monomer and dopant can be combined in a first solvent, and an oxidant is combined with a second solvent. Exemplary monomers include aniline, pyrrole, thiophene, toluidine, anisidine and other derivatives of aniline such as methylaniline, ethyl aniline, 2-alkoxyaniline, and 2,5-dialkoxyaniline. Exemplary oxidants include persulfates such as $(NH_4)_2S_2O_8$, $Na_2S_2O_8$ and $K_2S_2O_8$, metal salts such as iron (III) chloride, copper (II) chloride, silver nitrate, chloroauric acid and ammonium cerium(IV) nitrate, and peroxides such as hydrogen peroxide. The solvent can be water, an organic solvent, or a mixture thereof. In solvent mixtures of organic solvents and water, the organic solvent can be water miscible or water immiscible. Exemplary water immiscible solvents include haloalkanes such as methylene chloride carbon tetrachloride, chloroform, and dichloroethane, hydrocarbons such as benzene, toluene, xylene, and hexane. In some cases the solvent can be an ethers such as diethylether, or the solvent can be carbon disulfide. In certain embodiments, the oxidant is combined with water, while the monomer/dopant is combined in a water miscible organic solvent. Exemplary water miscible organic solvents include alcohols such as methanol, ethanol, isopropanol, glycerol, and ethylene glycol, ethers such as THF, 1,4-dioxane, dimethoxy ethane, and other solvents such as acetone, acetonitrile, DMSO, and DMF.

The oxidant can be added to the monomer/dopant/solvent mixture, either neat or dissolved in a solvent. Sonication or other forms of mixing may be employed to ensure complete dissolution in the solvent prior to or after combining. In certain embodiments the mixture can be in a mold to control the eventual shape of the conductive polymer. After the polymerization is complete, the resulting polymer can be purified by conventional processes such as dialysis or washing with deionized or distilled water.

Conductive polymers prepared according to the above method can be obtained as hydrogels when water is present as a solvent. Conductive polymer hydrogels can be converted to aerogels by dehydrating the hydrogel using techniques such as lyophilization. In some embodiments, the aerogel can be characterized by a water content of less than about 5%, less than about 4%, less than about 3%, less than about 2%, less than about 1%, or less than about 0.5% by weight, as measured by KF.

Supramolecular Complexes

The supramolecular complex can be an organometallic complex, and in certain embodiments the supramolecular complex can have a cubic architecture. The supramolecular complex, when apart from the conductive polymer, can be formulated as a composition characterized by a sol-gel transition of less than or about 80° C., less than or about 70° C., less than or about 60° C., or less than or about 50° C. Preferably the sol-gel transition is less than about 60° C. Cubic supramolecular organometallic complexes can include tritopic ligands, held together by ditopic metal-ligand bonds. The tritopic ligands form the vertices of the cube, which are held together by the ditopic metal-ligand bond. Such a cube can be represented by the molecular formula:

$$M_{12}L_8,$$

wherein M is a metal atom, and L is a tritropic ligand. In some embodiments, the metal ion can be a transition metal such as Zn, Cd, Ni, Co, Fe, Ru, and Mn. In certain preferred embodiments, the transition metal is Zn.

The tritopic ligand can be represented by the Formula I:

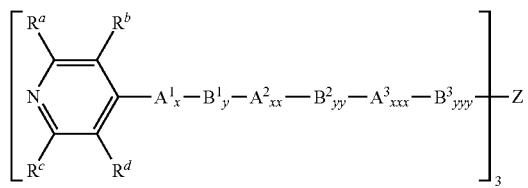

(Formula I)

wherein:
Z is a group of the formula:

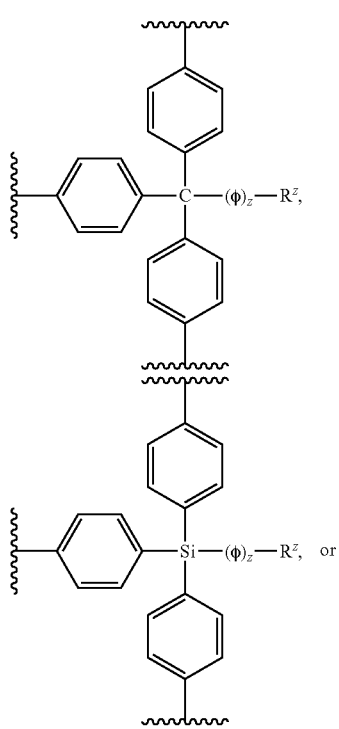

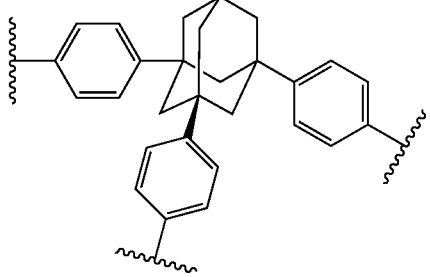

wherein each $\wedge$ represents a bond to a $B^3_{yyy}$, $B^3_{yyy}$ group, $\Phi$ represents a 1,4 phenylene, z is either 0 or 1, and $R^z$ is selected from hydrogen, $C_{1-12}$ alkyl, $C_{1-12}$ cycloalkyl, $C_{2-12}$ alkoxy, $C_{2-12}$ heterocyclyl, $C_{6-12}$ aryl, $C_{3-12}$ heteroaryl, poly (alkylene glycol), crown ethers (e.g., 12-4, 15-5, 18-6, 18-6 and the like), and pillarenes (macrocycles having multiple 1,4 hydroquinone units arranged in the ring);

x, xx, and xxx are each independently 0 or 1, and $A^1$, $A^2$ and $A^3$ are independently selected from:

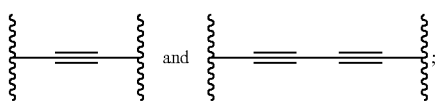

y, yy, and yyy are each independently 0, 1 or 2, and $B^1$, $B^2$ and $B^3$ are independently selected from

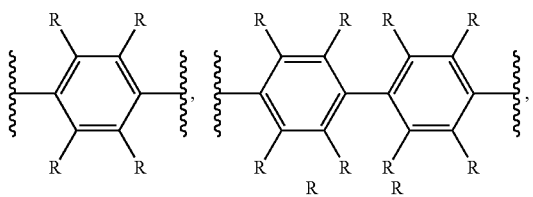

wherein R is in each case independently selected from hydrogen, halogen (e.g., F, Cl, Br, I), OH, COOH, $NO_2$, $C_{1-6}$ alkyl, $C_{1-6}$ haloalkyl, $C_{3-6}$ cycloalkyl, $C_{1-6}$ alkoxy, $C_{2-12}$ heterocyclyl, $C_{6-12}$ aryl, $C_{3-12}$ heteroaryl, and wherein any two or more R groups may together form a ring;
with the proviso that the sum of x, xx, xxx, y, yy, and yyy is not 0;
$R^b$ and $R^d$ are independently selected hydrogen, halogen (e.g., F, Cl, Br, I), OH, COOH, $NO_2$, $C_{1-6}$ alkyl, $C_{1-6}$ haloalkyl, $C_{3-6}$ cycloalkyl, $C_{1-6}$ alkoxy, $C_{2-12}$ heterocyclyl, $C_{6-12}$ aryl, $C_{3-12}$ heteroaryl;

$R^b$ and $R^d$ are independently selected from:

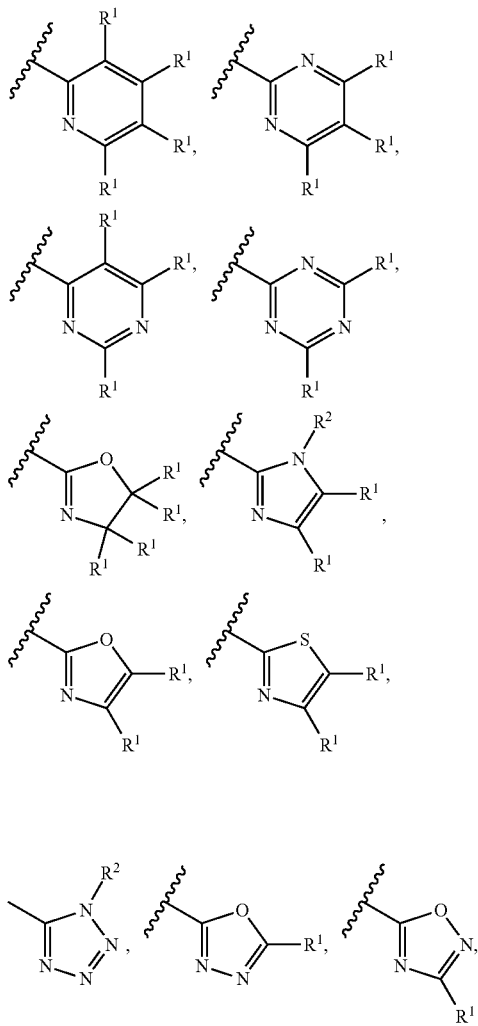

or wherein either $R^a$ and $R^b$ or $R^c$ and $R^d$, together form a group having the structure:

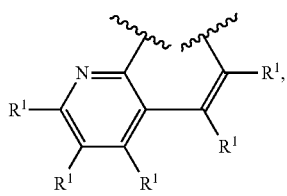

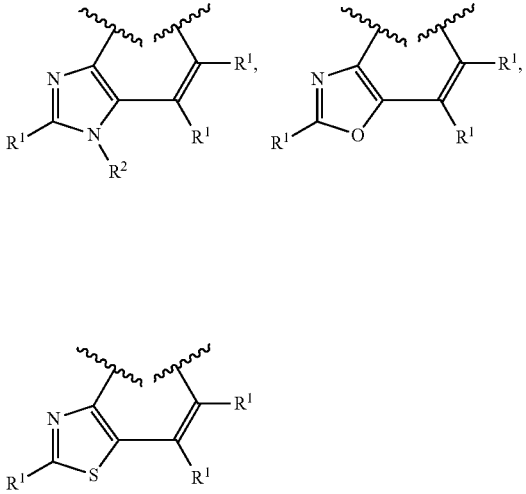

wherein $R^1$ is in each case independently selected from hydrogen, halogen, $C_1$-$C_6$ alkyl, $C_1$-$C_6$ alkoxy, $C_1$-$C_6$ haloalkyl, $R^2$ is in each case independently selected from $C_1$-$C_6$ alkyl, and wherein any two or more of $R^1$ or $R^2$ may together form a ring.

In certain embodiments, $R^a$ and $R^c$ are each:

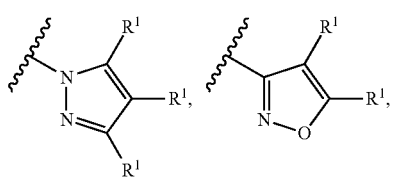

wherein $R^1$ is either hydrogen or $C_{1-6}$ akyl such as methyl or t-butyl. Selection of such 4-substituted pyridin-2-yl groups for $R^a$ and $R^c$ provides a tritopic ligand having the Formula Ia:

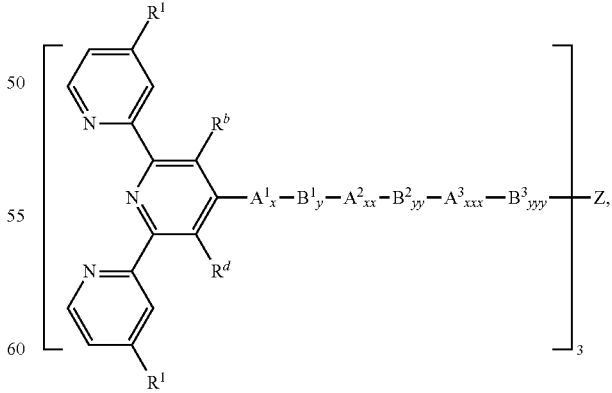

Formula Ia wherein Z, x, xx, xxx, $A^1$, $A^2$ and $A^3$, y, yy, yyy, $B^1$, $B^2$, $B^3$, $R^b$ and $R^d$ are as defined above, and $R^1$ is either hydrogen or $C_{1-6}$ alkyl. In some embodiments of either Formula I or Ia, $R^b$ and $R^d$ are each hydrogen.

In certain embodiments, Z is a group having the formula:

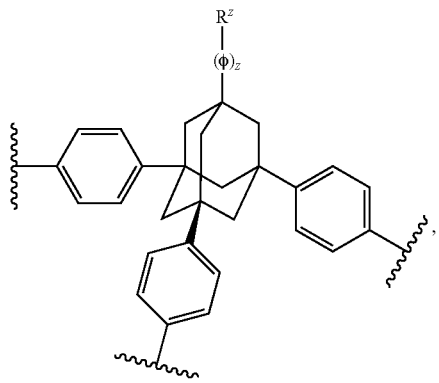

wherein $R^z$, z and Φ are as defined above.

In certain embodiments, each of $A^1$, $A^2$ and $A^3$, if present, are acetylenyl, e.g.:

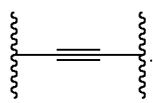

In some embodiments, each of wherein $B^1$, $B^2$ and $B^3$, if present, are each:

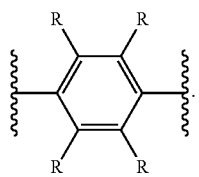

wherein R is as defined above. In certain embodiments, each R is hydrogen.

In certain embodiments, x, xx, xxx, y, yy, and yyy may each be selected to give the following tritopic ligands:

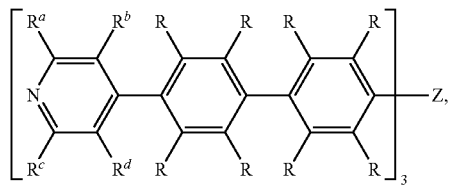

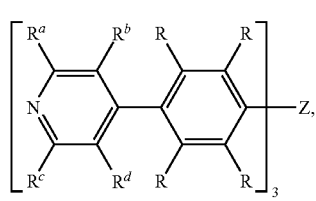

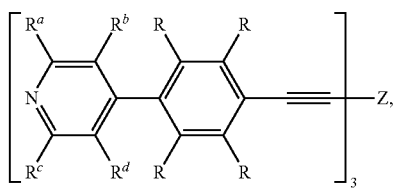

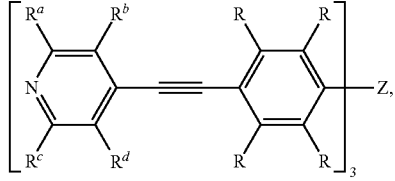

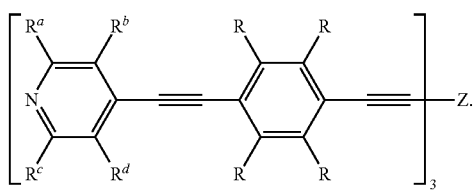

wherein $R^a$, $R^b$, $R^c$, $R^d$ and Z are as defined above, and R is independently selected from hydrogen, halogen (e.g., F, Cl, Br, I), OH, COOH, $NO_2$, $C_{1-6}$ alkyl, $C_{1-12}$ haloalkyl, $C_{3-6}$ cycloalkyl, $C_{1-6}$ alkoxy, $C_{2-12}$ heterocyclyl, $C_{6-12}$ aryl, $C_{3-12}$ heteroaryl, and wherein any two or more R groups may together form a ring.

Methods of Making Tritopic Ligands

The tritopic ligands can be assembled using conventional heterocyclic and organometallic protocols. Tri- and tetra-4-halophenyl methyl and silyl compounds are commercially available and can also be prepared by conventional methods. 4-halophenyl adamantyl derivatives can be prepared according to the following sequences:

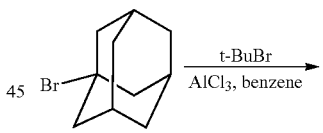

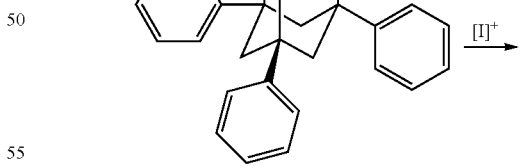

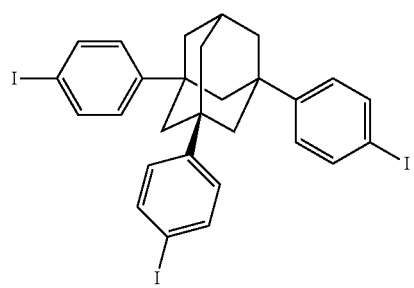

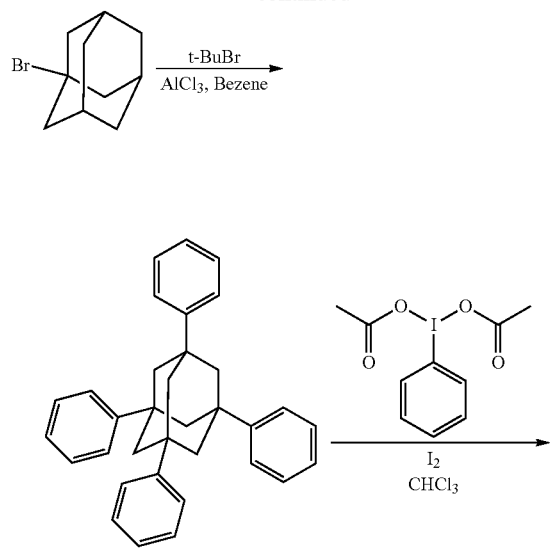

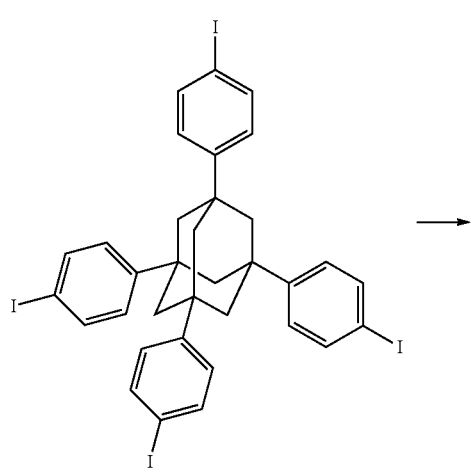

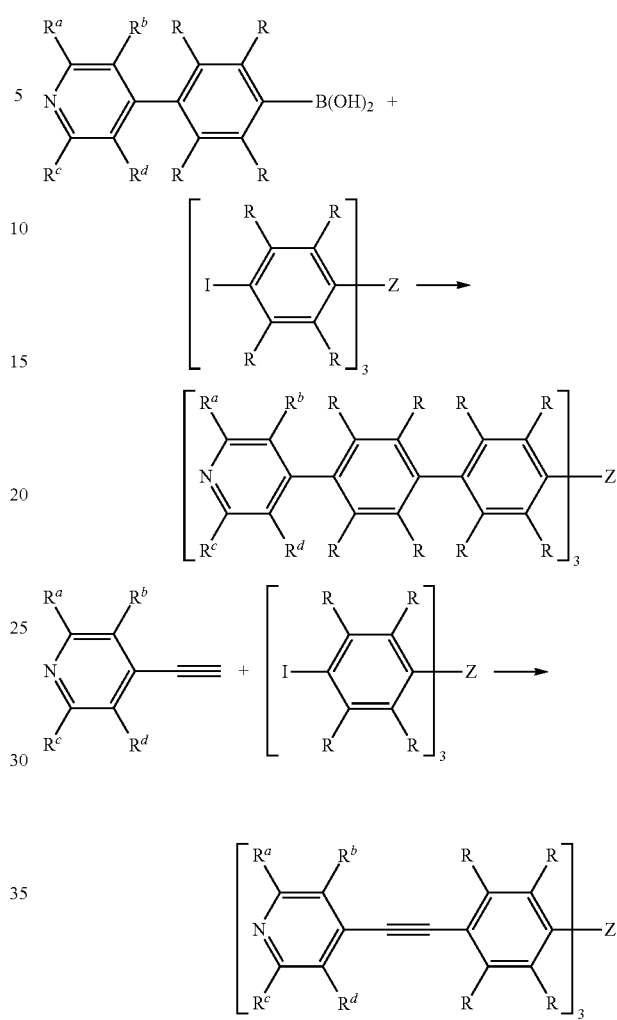

In some embodiments, individual A and B units can be joined using Suzuki, Heck, Hiyama, Kumada, Negishi, Stille, and Sonogashira chemistries. By way of examples, the following sequences can be used to prepare certain embodiments:

Variations and combinations of the above reactions can be used to prepare other $A^1_x B^1_y A^2_{xx} B^2_{yy} A^3_{xxx} B^3_{yyy}$ systems. The specific reaction conditions (catalyst/ligand system, time, temperature, and solvent) can be determined by those have ordinary skill in the art. Other methods of preparing aryl-aryl and aryl-alkynyl groups are known and can be employed as needed by those of skill in the art.

In some embodiments, symmetrically substituted pyridines (i.e., those in which $R^a$ is the same as $R^c$, and $R^b$ is the same as $R^d$) can be obtained via the following reaction:

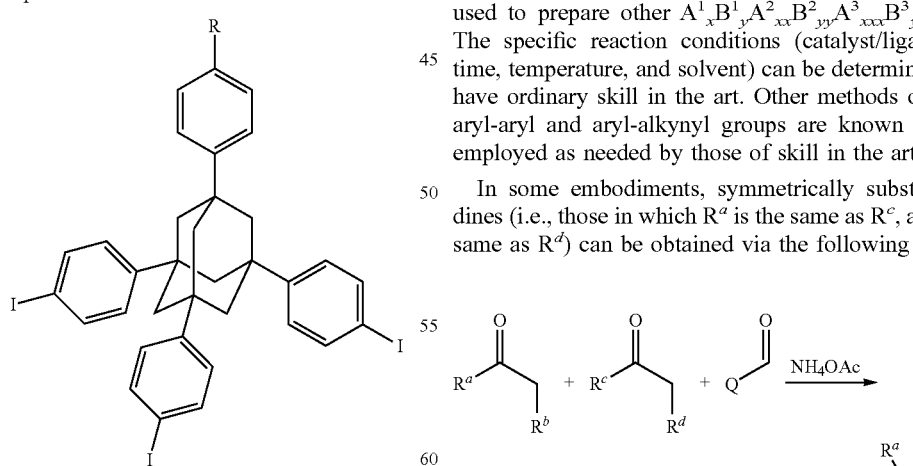

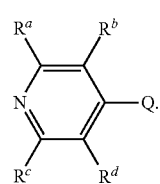

Asymmetrically substituted pyridines can be obtained according to the following reaction:

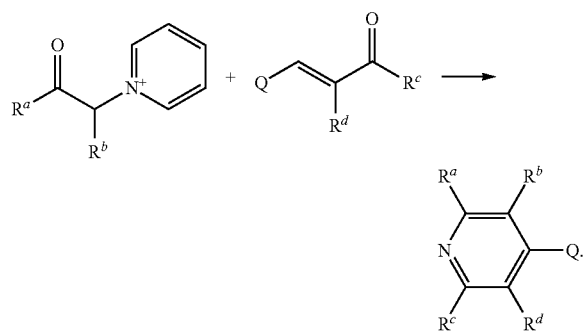

In the above sequences, $R^a$, $R^b$, $R^c$, and $R^d$ as defined above. Q can be substituted phenyl, alkynyl, halogen, hydroxyl and protected hydroxyl (i.e., silyl ethers, esters, benzyl ethers and the like), —boronic acid or boronic esters. Hydroxyl groups can subsequently be converted to cross-coupling reactive groups such as triflate, mesylate, phosphonate or sulfonate. The specific reaction conditions (time, temperature, solvent, nitrogen source) can be determined by those have ordinary skill in the art. Other methods of pyridine synthesis are known and can be employed as necessary.

Methods of Making Supramolecular Complexes

The supramolecular complexes can be formed by combining a metal salt and tritopic ligand together in an appropriate stoichiometric ratio. For instance, complexes having the Formula $M_{12}L_8$ are assembled using 1.5 molar equivalents of metal to tritopic ligand. Suitable metal sources include salts such as nitrate salts (e.g., $Zn(NO_3)_2$), halide salts (e.g., $CdCl_2$), and other salt forms known to those of skill in the art. The metal salt and tritopic ligand can be combined in a solvent, and then heated for a time sufficient assemble the supramolecular complex, followed by a precipitation step to isolate the complex. In some embodiments, the precipitation step includes a counterion exchange step to adjust the solubility of the complex. Exemplary counterions which may be used include nitrates, triflates, and non-coordinating anions such as tetrafluoroborate, hexafluorophosphate, tetrakis(pentafluorophenyl)borate, or bis(trifluoromethyl sulphonyl)imidate.

Methods of Making Networks

In certain embodiments, the network can be obtained by combining an aerogel and supramolecular complex together in a solvent, followed by partial evaporation of the solvent. The ratio of aerogel to supramolecular complex (w/w) can be from about 25:1 to 1:25, from about 25:1 to 1:10, from about 20:1 to 1:10, from about 20:1 to 1:5, from about 20:1 to 1:1, from about 15:1 to 1:1, or from about 10:1 to 1:1. The network, after partial evaporation, can contain solvent in an amount about 25-75%, about 30-70%, about 35-65%, about 40-60%, or about 45-55%. Suitable solvents include organic solvents, such as polar aprotic solvents. Exemplary polar aprotic solvents which can be used in the network include acetonitrile, THF, DMF and DMSO

EXAMPLES

The following examples are set forth below to illustrate the methods and results according to the disclosed subject matter. These examples are not intended to be inclusive of all aspects of the subject matter disclosed herein, but rather to illustrate representative methods, compositions, and results. These examples are not intended to exclude equivalents and variations of the present invention, which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures, and other reaction ranges and conditions that can be used to optimize the product purity and yield obtained from the described process. Only reasonable and routine experimentation will be required to optimize such process conditions.

All reagents were purchased from Aldrich, Matrix Scientific, Alfa Aesar and used without further purification. ((trimethylsilyl)ethynyl)benzaldehyde, 3 1-(4-tert-butylpyridin-2-yl)ethanone4 and 1,3,5,-tri(4-iodophenyl)-adamantane were synthesized according to the reported methods. Column chromatography was conducted using basic Al2O3 (Brockman I, activity, 58 Å) or $SiO_2$ (VWR, 40-60 um, 60 Å) and the separated products were visualized by UV light. $^1H$ NMR and $^{13}C$ NMR spectra data were recorded on a Bruker Avance 400-MHz and 600-MHz NMR spectrometer in CDCl3 and CD3CN with TMS standard. UV-vis absorption (UV) spectra were recorded with a Varian Cary 100 UV/Vis Spectrometer. Photoluminescence (PL) spectra were obtained on a PerkinElmer LS50B Luminescence spectrometer. Electrospray ionization (ESI) mass spectra were recorded with a Waters Synapt G2 tandem mass spectrometer, using solutions of 0.01 mg sample in 1 mL of $CHCl_3$/$CH_3OH$ (1:3, v/v) for ligand or 0.5 mg in 1 mL of MeCN/MeOH (3:1, v/v) for complex.

Example 1—Synthesis of Supramolecular Complex

To a solution of NaOH powder (1.6 g, 40 mmol) in 25 ml EtOH, 4-((trimethylsilyl)ethynyl)benzaldehyde (1.0 g, 5.0 mmol) and 4-tert-Butyl-2-acetylpyridine (2.0 g, 11.3 mmol) was added. After stirring at 25° C. for 6 h, aqueous $NH_3.H_2O$ (20 mL) was added and the mixture was refluxed for 20 h. After cooling to room temperature, the precipitate was filtered and washed with cold ethanol to give 1 as white solid: 1.2 g (54%); $^1H$ NMR (400 MHz, CDCl3): δ 8.82 (dd, J=2.1, 0.8 Hz, 2H, tpy-H 3,3"), 8.74 (s, 2H, tpy-H 3', 5'), 8.66 (dd, J=5.2, 0.7 Hz, 2H, tpy-H 6,6"), 7.95-7.86 (m, 2H, Ph-H B), 7.69-7.61 (m, 2H, Ph-H A), 7.39 (dd, J=5.2, 2.0 Hz, 2H, tpy-H 5,5"), 3.20 (s, 1H), 1.47 (s, 18H). $^{13}C$ NMR (100 MHz, CDCl3): δ 160.79, 156.13, 155.97, 149.32, 149.08, 138.94, 132.64, 127.27, 122.72, 121.16, 118.47, 118.25, 83.36, 78.44, 34.96, 30.54. ESI-HRMS (m/z): Calcd. For $[C_{31}H_{31}N_3+H]^+$: 446.2596. Found: 446.2595.

To a flask containing $Pd(PPh_3)_2Cl_2$ (56 mg, 0.08 mmol), CuI (7.6 mg, 0.04 mmol) and 1,3,5,-tri(4-iodophenyl)-adamantane (4) (370 mg, 0.5 mmol) in 20 ml THF, 8 ml $Et_3N$ was added. After stirring at room temperature for 10 minutes, the solution of the compound 1 (756 mg, 1.7 mmol) in 10 ml THF was slowly added over 1 h. The mixture was heated at 40° C. for 2 days. After removal of the volatile, the residue was purified by column chromatography on $Al_2O_3$ with chloroform as eluent to afford LA in 66% yield as a yellow solid. $^1H$ NMR (400 MHz, CDCl3): δ 8.83 (s, J=2.0, 0.8 Hz, 6H, tpy-H 3,3"), 8.77 (s, 6H, tpy-H 3',5'), 8.67 (d, J=5.2, 0.7 Hz, 6H, tpy-H 6,6"), 7.97-7.91 (m, 6H, Ph-H D), 7.72-7.68 (m, 6H, Ph-H C), 7.59 (d, J=8.6 Hz, 6H, Ph-H B), 7.49 (d, J=8.8 Hz, 6H, Ph-H A), 7.39 (dd, J=5.3, 2.0 Hz, 6H, tpy-H 5,5"), 2.62 (m, 1H), 2.17 (s, 6H), 2.07 (s, 6H), 1.48 (s, 54H). $^{13}$C NMR (100 MHz, CDCl3): δ 160.79, 156.09, 156.04, 150.15, 149.45, 149.08, 138.12, 132.10, 131.70, 127.27, 125.11, 124.14, 121.13, 120.81, 118.41, 118.26, 90.87, 88.89, 47.70, 41.21, 38.48, 34.99, 30.54, 30.06. ESI-HRMS (m/z): Calcd. for $[C_{121}H_{115}N_9+2H]^{2-}$ and $[C_{121}H_{115}N9+3H]^{3+}$: 847.9716 and 565.6530. Found: 847.9710 and 565.6525.

To a solution of ligand LA (6.5 mg, 3.8 μmol) in CHCl$_3$ (1 mL), a solution of Zn(NO$_3$)$_2$.6H$_2$O (1.7 mg, 5.7 μmol) in MeOH (3 mL) was added; then the mixture was stirred at 50° C. for 8 h. After cooling to room temperature, 200 mg NH$_4$PF$_6$ was added to give a white precipitate, and used water to wash and obtained product (yield: 93%). 1H NMR (400 MHz, CD3CN): δ 9.09 (s, 6H, tpy-H 3',5'), 8.69 (s, 6H, tpy-H 3,3"), 8.33 (s, 6H, Ph-H D), 7.95 (s, 6H, Ph-H C), 7.72 (m, 18H, tpy-H 6,6", Ph-H B, and Ph-H A), 7.44 (s, 6H, tpy-H 5,5"), 1.41 (s, 54H). 13C NMR (150 MHz, CD$_3$CN): δ 166.41, 154.85, 151.03, 149.71, 147.13, 135.58, 131.91, 131.20, 128.05, 125.15, 123.98, 120.97, 38.25, 35.15, 29.39. ESI MS (m/z): 1635.8 $[M-9PF6^-]^{9+}$ (calcd m/z: 1635.8), 1637.7 $[M-10PF6^-]^{10+}$ (calcd m/z: 1637.7), 1475.7 $[M-11PF6^-]^{11+}$ (calcd m/z: 1475.7), 1340.6 $[M-12PF6^-]^{12+}$ (calcd m/z: 1340.6), 1226.3 $[M-13PF6^-]^{13+}$ (calcd m/z: 1226.3), 1128.3 $[M-14PF6^-]^{14+}$ (calcd m/z: 1128.3), 1043.5 $[M-15PF6^-]^{15+}$ (calcd m/z: 1043.5), 969.2 $[M-16PF6^-]^{16+}$ (calcd m/z: 969.2), 903.6 $[M-17PF6^-]^{17+}$ (calcd m/z: 903.6), 845.4 $[M-18PF6^-]^{18+}$ (calcd m/z: 845.4), 793.2 $[M-19-PF_6^-]^{19+}$ (calcd m/z: 793.2), 746.4 $[M-20PF_6]^{20+}$ (calcd m/z: 746.4), 703.9 $[M-21PF_6^-]^{21+}$ (calcd m/z: 703.9), 665.3 $[M-22PF_6]^{22+}$ (calcd m/z: 665.3), and 630.0 $[M-23PF_6^-]^{23+}$ (calcd m/z: 630.0).

Example 2—Preparation of Network

In a typical synthesis process, solution A was prepared by dissolving pyrrole (84 μL) and phytic acid solution (50 wt %, 184 μL) in isopropanol (1 mL), followed by ultrasonicating for 5 mins. Then solution B was prepared by dissolving ammonium persulfate (APS) (184 mg) acting as initiator in deioned water (DI, 1 mL). The PPy hydrogel was polymerized by mixing solution A and B together. The as-prepared PPy hydrogel was immersed in DI for purification overnight and free-dried to obtain the PPy aerogel. Then the supramolecular complex of Example 1 (5 mg) was dissolved in acetonitrile (1 mL) and heated above 50° C. until a clear solution formed. The supramolecule solution was dipped into the PPy aerogel and the hybrid gel could form when temperature decreased.

Example 3—Preparation of Network Thin Film

Solution A and B were prepared as described above and dipped onto flexible substrates to form PPy hydrogel film. The PPy hydrogel film was then purified and freeze dried to obtain PPy aerogel film. Then the supramolecule gel was introduced into the aerogel film and network film could be obtained.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

What is claimed is:

1. A self-healing, conductive network composition comprising:
    a conductive polymer; and
    an organometallic supramolecular complex, having a cubic architecture.

2. The network composition according to claim 1, in the state of a gel.

3. The network composition according to claim 2, further comprising a solvent.

4. The network composition according to claim 1, wherein the ratio (w/w) of conductive polymer and supramolecular complex is from about 25:1 to 1:25.

5. The network composition according to claim 1, wherein the conductive polymer comprises a polyaniline, a polypyrrole, a polythiophene, a polystyrene sulfonic acid, or a combination thereof.

6. The network composition according to claim 1, wherein the conductive polymer comprises a compound of the formula:

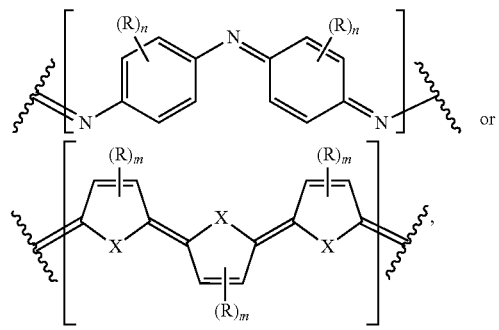

wherein R is $C_{1-6}$alkyl, $C_{1-6}$alkoxy, $C_{1-6}$haloalkyl, $C_{1-6}$haloalkoxy, F, Cl, Br, I, CN, NO$_2$, n is 0, 1, 2, 3 or 4, m is 0, 1 or 2, X is NH, O, S, Se, or a mixture thereof.

7. The network composition according to claim 1, wherein the conductive polymer comprises a dopant.

8. The network composition according to claim 1, wherein the conductive polymer comprises a dopant comprising a polybasic compound.

9. The network composition of claim 1, wherein the organometallic supramolecular complex, in the absence of the conductive polymer, is characterized by a sol-gel transition temperature no greater than about 75° C.

10. The network composition according to claim 1, wherein the organometallic supramolecular complex is represented by the formula $M_{12}L_8$, wherein M represents a transition metal and L represents a tritopic ligand.

11. The network composition according to claim 10, wherein M is selected from the group consisting of Zn, Cd, Ni, Co, Fe, Ru, Mn and combinations thereof.

12. The network composition according to claim 10, wherein the organometallic supramolecular complex comprises a tritopic ligand having the formula:

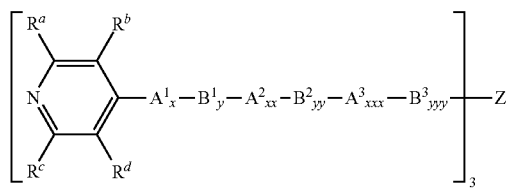

(Formula I)

wherein:

Z is a group of the formula:

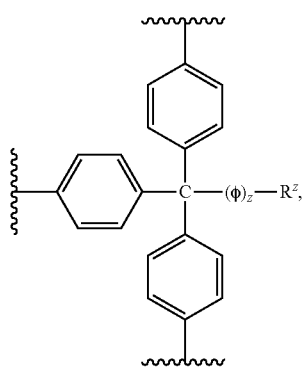

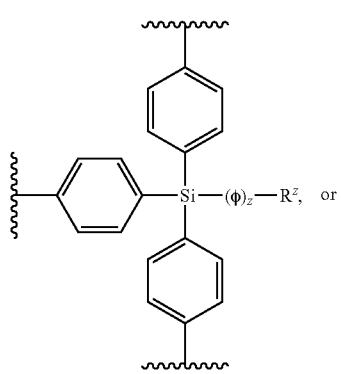

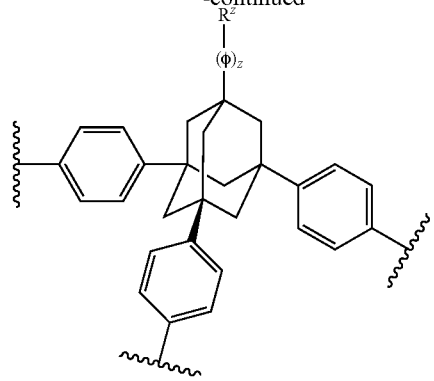

wherein each ⌇ represents a bond to a $B^3_{yyy}$ group, Φ represents a 1,4 phenylene, z is either 0 or 1, and $R^z$ is selected from hydrogen, $C_{1-12}$ alkyl, $C_{3-12}$ cycloalkyl, $C_{1-12}$ alkoxy, $C_{2-12}$ heterocyclyl, $C_{6-12}$ aryl, $C_{3-12}$ heteroaryl, poly(alkylene glycol), crown ethers, and pillarene;

x, xx, and xxx are each independently 0 or 1, and $A^1$, $A^2$ and $A^3$ are independently selected from:

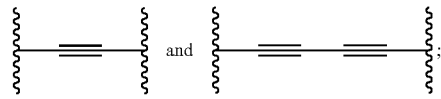

y, yy, and yyy are each independently 0, 1 or 2, and $B^1$, $B^2$ and $B^3$ are independently selected from

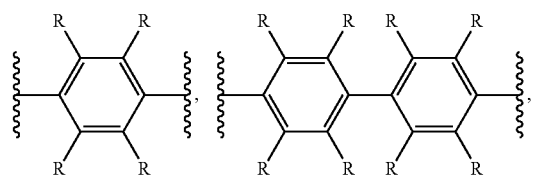

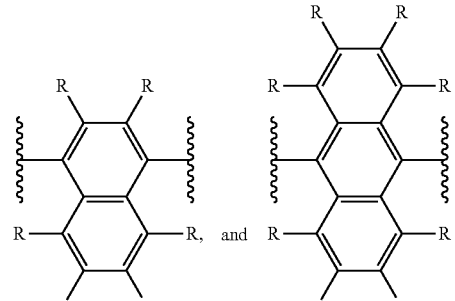

wherein R is in each case independently selected from hydrogen, F, Cl, Br, I, OH, COOH, $NO_2$, $C_{1-6}$ alkyl, $C_{1-6}$ haloalkyl, $C_{3-6}$ cycloalkyl, $C_{1-6}$ alkoxy, $C_{2-12}$ heterocyclyl, $C_{6-12}$ aryl, and $C_{3-12}$ heteroaryl, and wherein any two or more R groups may together form a ring;

with the proviso that the sum of x, xx, xxx, y, yy, and yyy is not 0;

$R^b$ and $R^d$ are independently selected hydrogen, halogen (e.g., F, $C_1$, Br, I), OH, COOH, $NO_2$, $C_{1-6}$ alkyl, $C_{1-6}$ haloalkyl, $C_{3-6}$ cycloalkyl, $C_{1-6}$ alkoxy, $C_{2-12}$ heterocyclyl, $C_{6-12}$ aryl, and $C_{3-12}$ heteroaryl;

$R^a$ and $R^c$ are independently selected from:

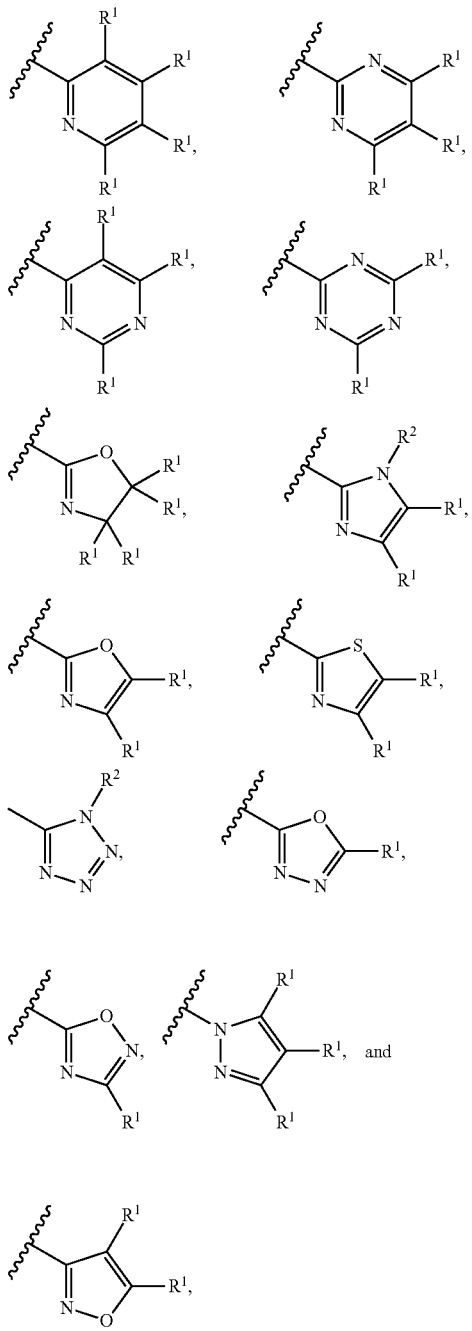

or wherein either $R^a$ and $R^b$ or $R^c$ and $R^d$, together form a group having the structure:

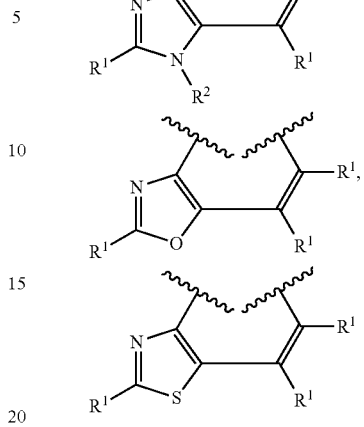

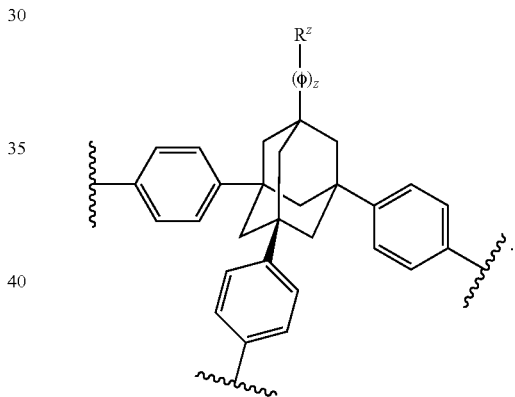

wherein $R^1$ is in each case independently selected from hydrogen, halogen, $C_1$-$C_6$ alkyl, $C_1$-$C_6$ alkoxy, and $C_1$-$C_6$ haloalkyl, $R^2$ is in each case independently selected from $C_1$-$C_6$ alkyl, and wherein any two or more of $R^1$ or $R^2$ may together form a ring.

13. The network composition according to claim 12, wherein Z has the formula:

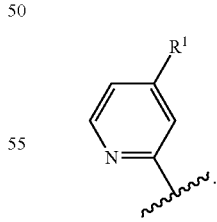

14. The network composition according to claim 12, wherein $R^b$ and $R^d$ are both hydrogen, and $R^a$ and $R^c$ each have the formula:

15. The network composition according to claim 14, wherein $R^1$ is in each case tert-butyl.

16. A method of making the self-healing, conductive network composition of claim 1, comprising the step of combining a dry conductive polymer, an organometallic supramolecular complex having a cubic architecture, and a solvent, and partially evaporating the mixture to give a self-healing, conductive network.

17. The method of claim 16, wherein the solvent comprises water, acetonitrile, THF, DMF, DMSO, or a mixture thereof.

18. The method of claim 16, wherein the network composition, after partial evaporation, comprises from about 40-60% by weight of the solvent.

\* \* \* \* \*

UNITED STATES PATENT AND TRADEMARK OFFICE
CERTIFICATE OF CORRECTION

PATENT NO.        : 10,669,399 B2
APPLICATION NO.   : 15/484597
DATED             : June 2, 2020
INVENTOR(S)       : Guihua Yu et al.

Page 1 of 1

It is certified that error appears in the above-identified patent and that said Letters Patent is hereby corrected as shown below:

In the Claims

Column 20, Line 65 for Claim 12, "(e.g., F, $C_l$, Br, I), OH, COOH, $NO_2$, $C_{1-6}$ alkyl, $C_{1-6}$" should read -- (e.g., F, Cl, Br, I), OH, COOH, $NO_2$, $C_{1-6}$ alkyl, $C_{1-6}$ --

Signed and Sealed this
Twenty-fifth Day of August, 2020

Andrei Iancu
*Director of the United States Patent and Trademark Office*